United States Patent [19]
Nakanishi et al.

[11] Patent Number: 6,029,693
[45] Date of Patent: Feb. 29, 2000

[54] VALVE DRIVING APPARATUS

[75] Inventors: Sadayuki Nakanishi, Hyogo; Yoshiharu Sato, Yamanashi; Akio Fukunaga, Hyogo, all of Japan

[73] Assignee: Kitz Corporation, Chiba, Japan

[21] Appl. No.: 08/836,744

[22] PCT Filed: Sep. 20, 1995

[86] PCT No.: PCT/JP95/01889

§ 371 Date: Jul. 23, 1997

§ 102(e) Date: Jul. 23, 1997

[87] PCT Pub. No.: WO97/11298

PCT Pub. Date: Mar. 27, 1997

[51] Int. Cl.[7] .................................................. F16K 17/32
[52] U.S. Cl. ..................... 137/486; 137/460; 137/487.5; 251/30.05; 251/31
[58] Field of Search ..................... 137/460, 486, 137/487.5; 251/31, 30.05

[56] References Cited

U.S. PATENT DOCUMENTS

| | | | |
|---|---|---|---|
| 4,120,478 | 10/1978 | Hasegawa | 251/31 |
| 4,355,654 | 10/1982 | Levesque | 137/460 |
| 5,004,014 | 4/1991 | Bender | 137/487.5 |
| 5,038,820 | 8/1991 | Ames et al. | 137/486 |
| 5,152,309 | 10/1992 | Twerdochlib et al. | 137/486 |
| 5,251,653 | 10/1993 | Tucker et al. | 137/460 |

*Primary Examiner*—A. Michael Chambers
*Attorney, Agent, or Firm*—Wenderoth, Lind & Ponack, L.L.P.

[57] ABSTRACT

A valve driving apparatus for actuating a shutoff valve or a dump valve provided in a pipeline for conveying a gaseous or liquid substance. The valve driving apparatus is constructed by disposing a gas/oil type booster and a hydraulic pump between a gas pipe which is branched from a primary side of the gas pipeline and a cylinder of an actuator and connecting them with a pipe thereby driving the actuator to close the shutoff valve or open the dump valve with the hydraulic pressure raised by the booster with the primary side pressure of the gas pipeline as the power source and meanwhile resetting the booster with a hydraulic pump disposed between the booster and the actuator thereby enabling the gas in the booster to return to the gas pipeline via the gas pipe.

14 Claims, 9 Drawing Sheets

VALVE DRIVING APPARATUS

BACKGROUND OF THE INVENTION

1. Field of the Invention

This invention relates to a valve driving apparatus for actuating a shutoff valve or a dump valve provided in a pipeline for conveying a gaseous or liquid substance.

2. Description of the Related Art

In a gas pipeline, for example, shutoff valves are installed at various positions on the route along which the pipeline is laid. It is known in the art to operate such a shutoff valve by means of an actuator which uses, as the power source force thereof, the gas pressure in the pipeline to be extracted therefrom in the vicinity of the seat of the shutoff valve. In this case, however, the apparatus is dangerous because the spent gas emanating from the actuator is released into the open air. Where the gas so released into the open air has the possibility of doing harm to men and beasts, the gas pressure of the pipeline cannot be utilized as the power source. Thus, it is necessary to resort to the practice of additionally providing a separate pressure cylinder of air, nitrogen, or carbon dioxide and utilizing this cylinder as a power source for the actuator.

When the pressure cylinder is used as mentioned above, the pressure of the cylinder actuates the shutoff valve by overcoming the gas pressure of the gas pipeline and, therefore, must be higher than the pressure required by the actuator. Since the cylinder has a limited capacity, the shutoff valve in the process of switching may possibly cease to operate due to a shortage of pressure. The cylinder, therefore, demands enormous labor for replenishment of its content or replacement of the cylinder itself for a new supply. Further, if the replenishment or replacement of the cylinder mentioned above is incomplete, the pressure cylinder will possibly fail to actuate the shutoff valve and consequently cause an accident or even endanger the operation of the gas pipeline.

An object of this invention is to provide a valve driving apparatus which safely uses the gas pressure of a gas pipeline as the power source for the actuator which serves to operate a shutoff valve or a dump valve in the pipeline without causing the spent gas pressure to leak into the ambient air and harm and, moreover, completely obviates the necessity for relying on a pressure cylinder of air, nitrogen, or carbon dioxide as the power source.

In the case of a driving apparatus which uses the gas of a pipeline as the power source for an actuator as mentioned above, and incorporates therein a closed gas line so constructed as to return the gas to the pipeline, if the pressure of the pipeline is lowered, the shutoff valve will possibly fail to operate normally.

It is conceivable herein to provide a gas tank filled with a compressed nonflammable gas and a booster which are separately disposed. If the gas tank and the booster are so constructed as to be connected to each other with a pipe, the apparatus will have the possibility of producing a defective operation on account of the leak through the point of connection. Further, since the booster and the gas tank are separate entities, the space for their installation is so large as to render it difficult to make the driving apparatus compact.

Another object of this invention is to provide a valve driving apparatus which promotes a reduction in size of the apparatus by disposing a booster within a gas tank, and enables the gas pressure in the gas tank to remain constantly at a prescribed level by causing the fluid flowing through the pipeline to fill the gas tank automatically when the gas pressure in the gas tank falls below the prescribed level during operation of the booster. Thus, the present invention obviates completely the necessity for replenishing the gas tank or replacing the cylinder, suffers only few leaky points, and excels in safety and economy.

SUMMARY OF THE INVENTION

To accomplish the objects mentioned above, this invention provides a valve driving apparatus for actuating a shutoff valve or a dump valve incorporated in a gas pipeline. A gas/oil type booster and a hydraulic pump are disposed between a gas pipe branched from the primary side of the gas pipeline and the cylinder of an actuator and connecting them with a pipe thereby driving the actuator to close the shutoff valve or open the dump valve with the hydraulic pressure exalted by the booster with the primary side pressure of the gas pipeline as the power source. Meanwhile the booster is reset with a hydraulic pump disposed between the booster and the actuator thereby enabling the gas in the booster to return to the gas pipeline via the gas pipe mentioned above.

Properly in this case, the oil tank is connected to the hydraulic pump and the amount of oil discharged by one stroke of the booster is such as to induce not less than two strokes of the cylinder mentioned above.

Another aspect of this invention concerns a valve driving apparatus for opening and closing a shutoff valve or a dump valve provided in a gas pipeline. The driving apparatus is constructed by connecting a gas pipe, branched from the primary side of the gas pipeline, to a gas chamber of a gas/oil type booster through the medium of a reducing valve. A check valve is disposed between the reducing valve and the gas/oil type booster, meanwhile causing the gas pipe connected to the gas chamber to be connected to the secondary side of the gas pipeline mentioned above through the check valve. The relation of the gas pressure between the gas pipe and the booster is set so as to satisfy the expression, pressure on the primary side of the pipeline>pressure on the secondary side of the pipeline>pressure in the gas chamber of the booster. An oil pipe is disposed between the oil chamber of the booster mentioned above and the cylinder of the actuator, thereby setting the operation of the actuator to close or open the shutoff valve or the dump valve by means of the hydraulic pressure in the oil pipe exalted by the booster with the gas pressure exerted to the gas chamber of the booster as the power source and causing the hydraulic pump disposed in the oil pipe to reset the booster with the further exalted hydraulic pressure in the oil pipe and enabling the gas in the booster to be fed to the secondary side of the gas pipeline via the gas pipe mentioned above.

In this case, the gas may be fed to another line passing the same gas instead of to the secondary side of the gas pipeline.

Still another aspect of this invention concerns a valve driving apparatus, which is constructed by providing a shutoff valve or a dump valve in a gas pipeline, disposing a hydraulic cylinder type actuator so as to open or close the shutoff valve or the dump valve when the pressure on the secondary side of the pipeline is lower than the pressure on the primary side thereof, and connecting oil pipes disposed on opposite sides of the cylinder of the actuator to the oil chambers of the gas/oil type boosters thereof thereby enabling the gas chamber of one of the boosters to be connected to the gas pipe which is branched from the secondary side of the gas pipeline when the gas chamber of the other booster is connected to the gas pipe which is branched from the primary side of the gas pipeline.

Properly in this case, the oil pipe, connected between one side or the other side of the cylinder and the booster, is disposed so as to be selectively connected to the oil tank. Also, the oil in the oil tank is consequently returned by the hydraulic pump to the cylinder or the booster.

Yet another aspect of this invention concerns a valve driving apparatus for actuating a shutoff valve or a dump valve provided in a pipeline for conveying a fluid. The driving apparatus is constructed by disposing inside a gas tank a booster for connection to a valve-driving actuator thereby establishing internal communication between the gas tank and part of the booster and, at the same time, connecting the gas tank and the pipeline with a feed pipe through the medium of constant pressure feeding means thereby causing the pressure exalted by the booster along with the pressure of the gas tank as the power source to drive the valve-driving actuator and consequently actuate the shutoff valve or the dump valve.

Properly in this case, the constant pressure feeding means is formed by connecting the secondary side of a back pressure valve and the inlet side of a check valve and, at the same time, connecting the primary side of the back pressure valve and the outlet side of the check valve. The gas tank is filled at a prescribed pressure with a fluid selected from among air, nitrogen, carbon dioxide, or inert gas which may be mingled with the fluid of the pipeline without causing any trouble. The secondary side of the back pressure valve is connected to the feed pipe on the pipeline side and meanwhile the primary side of the back pressure valve is connected to the feed pipe on the tank side. Also, the fluid flowing through the pipeline is caused to fill the gas tank and the gas tank is consequently enabled to retain the gas pressure at the constant level when the gas pressure in the gas tank tends to fall below the prescribed level.

Since the valve driving apparatus of this invention utilizes the gas pressure of the gas pipeline as the power source for actuating the shutoff valve or the dump valve as described above, there is no need for a power source such as a pressure cylinder or for the labor which is otherwise necessary in the replenishment or replacement of a cylinder. The possibility of the apparatus developing or aggravating trouble on account of insufficient preparation for the replenishment or replacement, therefore, is nil. Moreover, the apparatus can be used safely since the apparatus does not release spent gas into the open air, and it does not waste the gas nor does the gas harm the environment. The provision of one Y-branch pipe suffices to extract the gas from the pipeline and return the gas to the pipeline. The apparatus allows simplification of the equipment such as for piping.

Further, since the pressure as the power source is fed via the booster to the actuator and consequently the selection of the booster and the actuator can be optimized, the valve driving apparatus to be provided is compact and inexpensive. Further, the hydraulic pump for resetting the booster can be utilized for returning the gas as the power source to the pipeline when the gas pressure is absent or the power supply is stopped. The pump can be operated both manually and automatically.

Since the valve driving apparatus of this invention has the booster disposed within the gas tank, the apparatus proper itself can be manufactured as a compact structure. Moreover, the gas tank does not require the work of replenishing gas or the work of replacing a cylinder because it is capable of feeding the gas of the pipeline with a prescribed pressure through the medium of the constant pressure feeding means. The gas in the gas tank cannot pollute the environment because there is no possibility of the gas being released into the open air under any condition. This invention accordingly provides a maintenance-free valve driving apparatus which excels in reliability, economy, and safety.

DETAILED DESCRIPTION OF THE INVENTION

Figure 1:
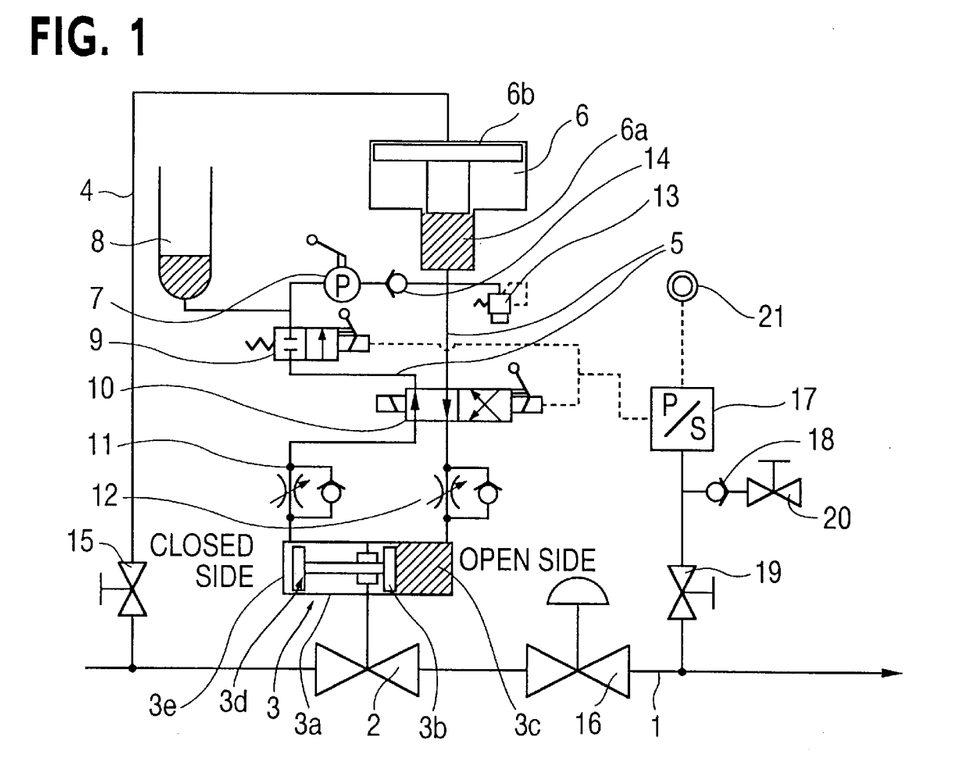
FIG. 1 is a piping system diagram illustrating the first embodiment of a valve driving apparatus according to present invention.

FIG. 1 is a piping system diagram illustrating the first embodiment of the valve driving apparatus of this invention.

In the diagram, a gas pipeline 1 conveys a gas in the direction indicated by an arrow. A shutoff valve 2 is provided in the gas pipeline 1 and a hydraulic cylinder type valve driving apparatus or actuator 3 is attached to the shutoff valve 2 and adapted to open and close the shutoff valve 2. The shutoff valve is opened and closed by the hydraulic motion of a piston 3b in a cylinder 3a of the actuator 3. FIG. 1 depicts the case in which the shutoff valve 2 is in an open state. A gas/oil type booster 6 is disposed between a gas pipe 4, branched from the primary side of the gas pipeline 1, and an oil pipe 5 connected to the cylinder 3a. The actuator 3 operates to actuate the shutoff valve 2 by the hydraulic pressure within the oil pipe 5 which is raised by the booster 6 with the pressure on the primary side of the gas pipeline 1 as the power source.

Where the shutoff valve 2 is adapted to produce a plurality (two or three, for example) of motions, the booster 6 has only to be capable of generating such an amount of oil as is necessary for the number of motions.

The oil pipe 5 is provided with a hydraulic pump 7 and is connected to an oil tank 8. By the pressure in the oil hydraulic pump 7 to a level higher than the pressure in the oil pipe 5, the oil in the oil pipe 5 including the oil in the oil tank 8 is forwarded into an oil chamber 6a of the booster 6 to reset the booster 6 and return the gas in gas chamber 6b of the booster 6 to the pipeline via the gas pipe 4.

Figure 3:
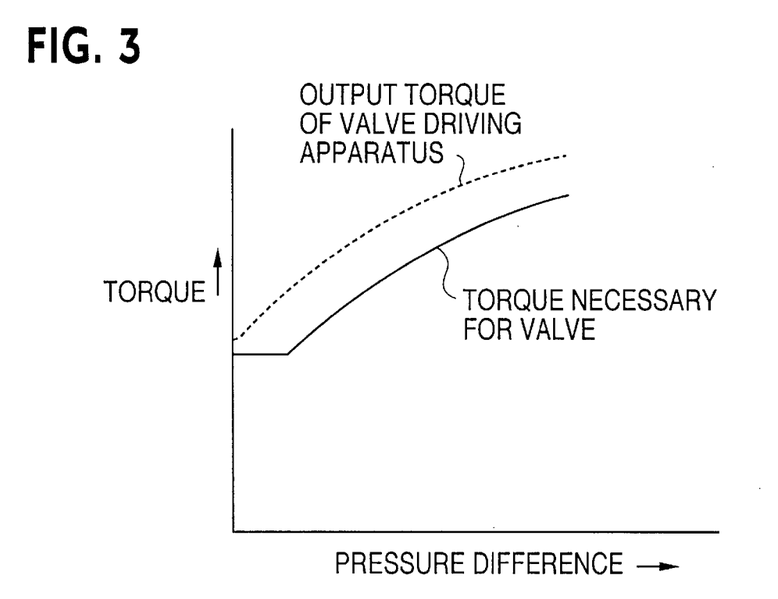
FIG. 3 is a diagram comparing output torques of the valve driving apparatus.

As concerns the ratio of amplification of the booster 6, the valve operates normally without reference to the condition of the line pressure for extracting the gas pressure as the power source and the torque (diameter of the cylinder and length of the arm) by the ratio of amplification of the booster are made constantly to surpass the necessary torque of the valve at the width of variation of the this line gas pressure as shown in the diagram of FIG. 3.

This condition will be explained below with reference to the explanatory diagram of FIG. 4. To cite the case of using a ball valve having a necessary torque of 2200 kgm and an actuator of the ram type scotch yoke system, for example, the output torque T which is involved in the operation requiring the power source pressure to be increased by the booster before it is fed to the actuator is as follows.

The efficiency, $\mu$, is assumed to be 1.

$$T = \pi/4 \times d^2 \times L \times P \times M \times 2 \text{ (2 is peculiar to the scotch yoke system)}$$
$$= \pi/4 \times 9^2 \times 10 \times 70 \times 2.58 \times 2$$
$$= 229,785 \text{ kgcm}$$
$$= 2,297 \text{ kgm} \rangle 2,200 \text{ kgm}$$

Figure 4:
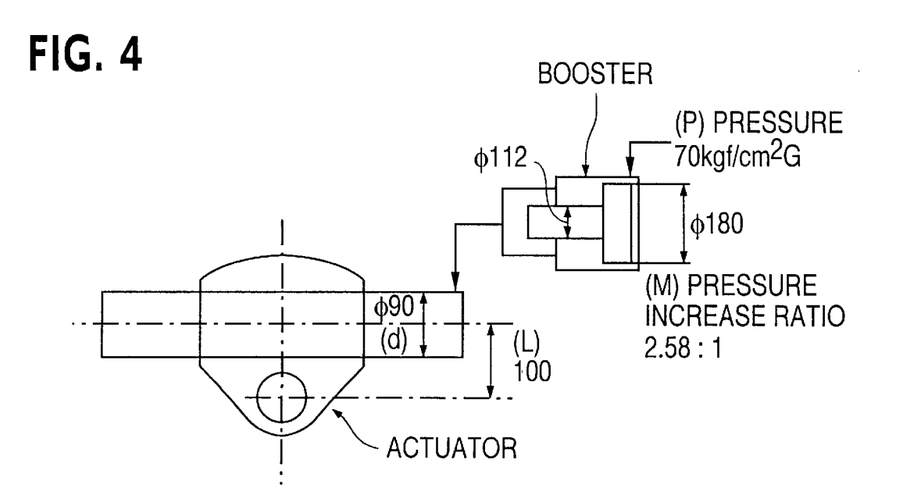
FIG. 4 is an explanatory diagram for aiding in the description of the output torque of an actuator.

When the power source pressure, P, is 70 kgf/cm2 G as shown in FIG. 4, it surpasses the necessary torque. This actuator, intended for emergency shutdown, is adapted to keep the valve constantly in the open state and produce three motions, i.e. open close open close, even during a power failure.

In FIG. 1, reference numeral 9 represents an open-close grade solenoid valve and 10 a switch grade solenoid valve. For each of these solenoid valves 9 and 10, either a four-way solenoid valve or a pair of two-way solenoid valves is used. Also, reference numerals 11 and 12 each represent a speed controller, reference numeral 13 represents a relief valve, reference numeral 14 represents a check valve, and reference numeral 15 is a stop valve. Then, reference numeral 16 represents a flow volume control valve, reference numeral 17 is a pressure switch, reference numeral 18 denotes a check valve, reference numerals 19 and 20 each indicate a stop valve, and reference numeral 21 indicates a power source. The broken line indicates a control grade electric wiring.

The open-close grade solenoid valve 9 mentioned above is preferably constructed so as to retain the booster 6 in place even when the switch grade solenoid valve 10 suffers from leakage. Particularly when solenoid valve 9 is formed in a non-leak (perfect seal) type construction, it can retain the position of the booster 6 for a long time.

Now, the operation of the embodiment described above will be explained.

As illustrated in FIG. 1, the oil pipe 5 which is disposed between the booster 6 and the opposite sides of the cylinder 3a is provided with the open-close grade solenoid valve 9, the switch grade solenoid valve 10, the hydraulic pump 7, the speed controllers 11 and 12, the check valve 14, and the relief valve 13. While the open-close grade solenoid valve 9 and the switch grade solenoid valve 10 are each furnished with a manually operating lever, they are adapted to be actuated by a signal in the case of an emergency which will be specifically described herein below or by an operating signal from a control room.

In FIG. 1, the shutoff valve 2, maintained in an open state allows gas in a normal state to flow into the pipeline 1 in the direction indicated by the arrow.

Gas pressure is supplied to the gas chamber 6b of the gas/oil booster 6 from the gas pipe 4 which is branched from the primary side of the gas pipeline 1. The oil chamber 6a of the booster 6 is connected through the oil pipe 5 to a valve-opening pressure side 3c of the cylinder 3a and the hydraulic pressure, raised by the booster 6 with the gas pressure as the power source, is exerted on the valve-opening pressure side 3c of the Piston 3b. The other side, namely a valve-closing pressure side 3e, of the cylinder 3a is connected through the switch grade solenoid valve 10 to the oil tank 8. Since the open-close grade solenoid valve 9 is kept in a closed state, the shutoff valve 2 retains an open state and, at the same time, the position of the booster is retained.

When the gas pipeline 1, for example, sustains damage on the downstream side thereof and a large volume of the gas leaks and, as a result, the Pressure on the downstream side of the flow volume control valve 16 is lowered or the downstream side pressure is raised by some cause, the pressure switch 17 senses this accident and issues a signal for an emergency stop or release of the shutoff valve 2 or the control room issues a signal for actuating the shutoff valve 2. In this case, the switch grade solenoid valve 10 switches and, at the same time, the open-close grade solenoid valve 9 opens to establish communication between the valve opening pressure side 3c of the cylinder 3a and the oil tank 8 and induce discharge of the oil from the valve opening pressure side 3c of the cylinder 3a into the oil tank 8. As a result, the hydraulic pressure raised by the booster 6 is exerted on the valve closing pressure side 3e of the cylinder 3a to move the Piston 3d to the right in FIG. 1 and close the shutoff valve 2.

When the hydraulic pump 7 is operated in the ensuant state, the oil in the oil tank 8 opens the check valve 14 and advances to the oil chamber 6a of the booster 6 and the resultant hydraulic pressure overcomes the gas pressure in the gas chamber 6b of the booster 6 and resets the booster 6 while returning the gas in the gas chamber 6b to the pipeline 1.

Then, when the shutoff valve 2 is opened either in response to an operating signal from the control room or by manual manipulation, the switch grade solenoid valve 10 switches and enables the hydraulic pressure from the booster 6 to be supplied to the valve opening pressure side 3c of the cylinder 3a and the open-close grade solenoid valve 9 opens and enables the oil to be discharged from the valve closing pressure side 3e of the cylinder 3a into the oil tank 8. As a result, the hydraulic pressure from the oil chamber 6a of the booster 6 mentioned above actuates the valve driving apparatus 3 and opens the shutoff valve 2. After the shutoff valve 2 is opened, though the open-close grade solenoid valve 9 resumes the state shown in FIG. 1, the hydraulic pressure of the booster 6 continues to be exerted on the valve opening pressure side 3c of the cylinder 3a due to the switch grade solenoid valve 10. The shutoff valve 2 is closed by switching the switch grade solenoid valve 10 and, at the same time, opening the open-close grade solenoid valve 9. The shutoff valve 2 can be similarly opened and closed by the manual levers of the two solenoid valves 9 and 10.

The booster 6 is required, within the ordinary width of variation of the gas pressure in the gas pipeline 1, to provide constantly a ratio of amplification enough which is sufficient to actuate the shutoff valve 2 relative to the width of variation of the torque necessary for actuating the shutoff valve 2 arising from the variation of the gas Pressure. The stop valves 15, 19, and 20 are intended for maintenance, inspection, etc. and the relief valve 13 is intended for the safety of the line including the oil Pipe 5. Besides being applicable to a gas line, this valve driving apparatus can be attached to the shutoff valve which is provided for a pipeline for conveying a liquid substance.

Figure 2:
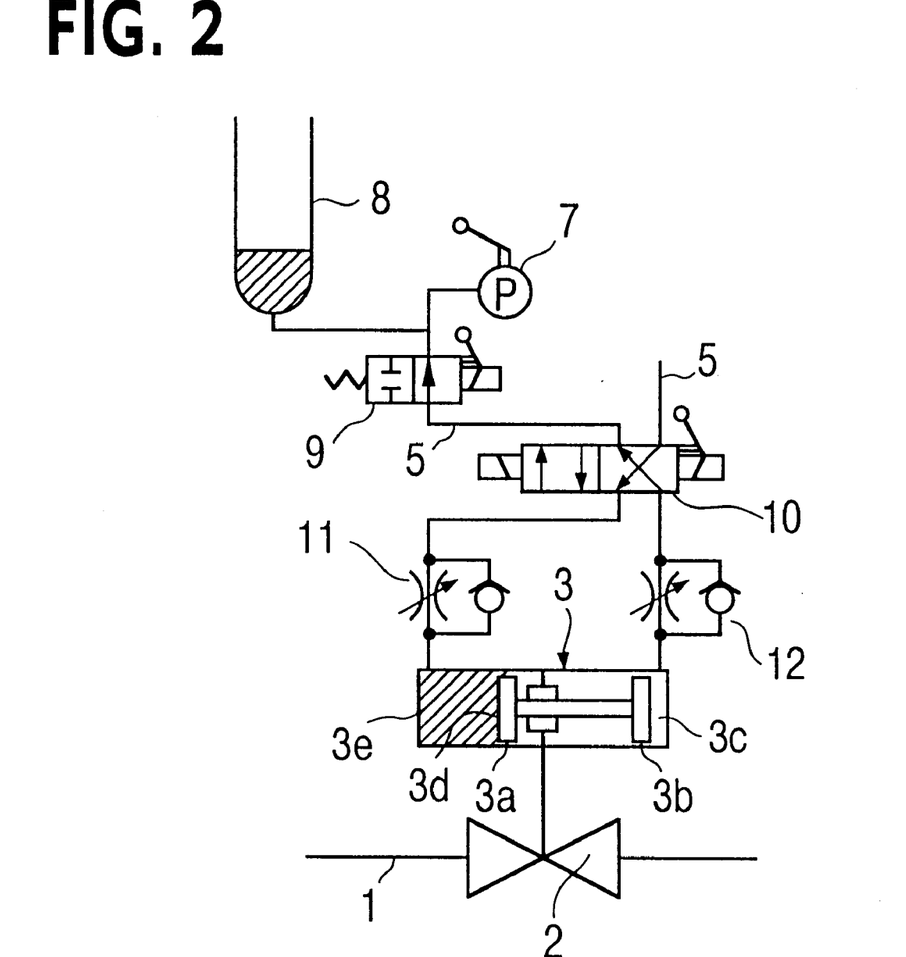
FIG. 2 is a partial piping system diagram illustrating the state of closure of a valve in the apparatus of FIG. 1.

The first embodiment described above has depicted an example of the valve driving apparatus employed for closing the shutoff valve. It can be otherwise applied to a valve driving apparatus adapted to actuate a dump valve provided in a gas pipeline. To be specific, this valve driving apparatus is constructed, as illustrated in FIG. 2, by disposing the gas/oil type booster 6 and the hydraulic pump 7 between the gas pipe 4 branched from the primary side of the gas pipeline 1 and the cylinder 3a of the actuator 3 and connecting them with the oil pipe 5 thereby driving the actuator 3 and opening the dump valve 2 as shown in FIG. 1 by the hydraulic pressure raised by the booster 6 with the pressure on the primary side of the gas pipeline 1 as the power source and meanwhile disposing the hydraulic pump 7 between the booster 6 and the actuator 3 thereby resetting the booster 6 by means of the hydraulic pump 7 and returning the gas in the booster 6 through the gas pipe 4 to the gas pipeline. In this case, the construction, operation, and effect of this embodiment are approximately equal to those of the first embodiment except that the function of the dump valve in this embodiment takes the place of the function of the shutoff valve in the first embodiment mentioned above.

Figure 5:
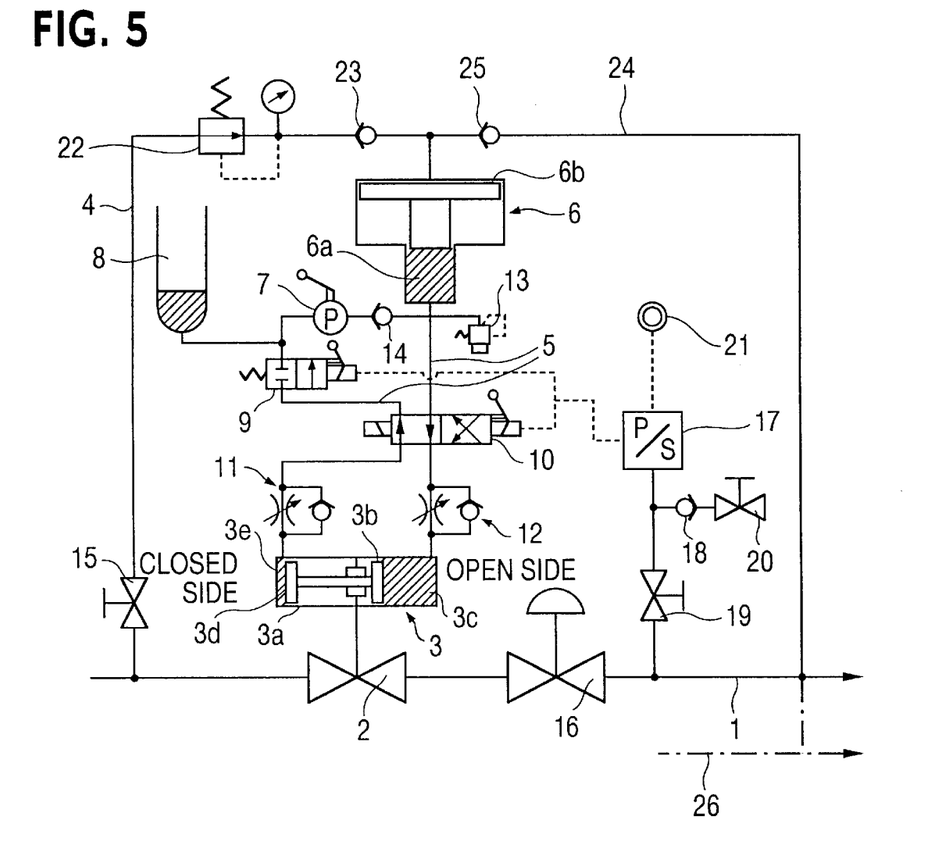
FIG. 5 is a piping system diagram illustrating a second embodiment of the valve driving apparatus according to the present invention.

FIG. 5 is a piping system diagram illustrating a second embodiment of the valve driving apparatus according to this invention. In this diagram, like parts of the first embodiment found in FIG. 1 are denoted by like reference numerals. While these parts will be omitted from the following description, they have the same operations and effects as those of the first embodiment.

A reducing valve 22 is connected to the gas pipe 4 branched from the primary side of the gas pipeline 1. A check valve 23 is connected to the leading end of the reducing valve 22, and the leading end of the check valve 23 is connected to the gas chamber 6b of the gas/oil type booster 6. A check valve 25 extends in the same direction and is connected to another gas pipe 24 which is connected to the gas chamber 6b. The leading end of the check valve 25 is connected to the secondary or downstream side of the gas pipeline 1. In this case, the relation of 9 gas pressure is so set as to satisfy the following expression: Pressure on the primary side of the Pipeline 1>pressure on the secondary side of the pipeline 1>pressure of the gas chamber 6b of the booster 6.

The oil pipe 5 is disposed, as shown in FIG. 5, between the oil chamber 6a of the booster 6 and the cylinder 3a of the actuator 3 so that the hydraulic Pressure in the oil pipe 5, raised by the booster 6 with the gas pressure exerted to the gas chamber 6b as the power source, may operate the actuator 3 and consequently open and close the shutoff valve 2.

The oil pipe 5 is furnished with the hydraulic pump 7 and is connected to the oil tank 8 so that the Pressure raised by the hydraulic pump 7 to a level higher than the pressure in the oil Pipe 5 may supply the oil in the hydraulic pipe 5 including the oil in the oil tank 8 into the oil chamber 6a of the booster 6 and consequently reset the booster 6 and discharge the gas in the gas chamber 6b of the booster 6 through the gas pipe 24 to the secondary side of the pipeline 1.

Now, the operation of the second embodiment described above will be explained.

The gas pipe line 4, branched from the primary side of the shutoff valve 2 in the gas pipeline 1 is passed through the reducing valve 22 and connected to the gas chamber 6b of the gas/oil type booster 6 and the reduced gas pressure is supplied to the gas chamber 6b. The check valve 23 is disposed as to pass the gas from the reducing valve 22.

To the gas chamber 6b is connected another gas pipe 24, which is connected to the secondary side of the gas pipeline 1. A check valve 25 extends in the direction of the pipeline 1 and is disposed halfway along the length of the gas pipe 24.

The relation of pressure satisfying the expression, pressure on the primary side of the pipeline 1>pressure on the secondary side of the pipeline 1>pressure of the gas chamber 6b of the booster 6, is established because the flow volume control valve 16 is disposed on the upstream side relative to the position at which the gas pipe 4 is connected to the pipeline 1.

The gas pressure, flowing through the gas pipe 4 branched from the primary side of the gas pipeline 1 is supplied to gas chamber 6b. The oil chamber 6a of the booster 6 is connected to the oil Pipe 5 which is connected to the valve opening pressure side 3c of the cylinder 3a so that the hydraulic pressure raised by the booster using the gas pressure as the power source may be supplied to the valve opening pressure side 3c of the piston 3b. While the other side, i.e. the valve closing pressure side 3e, of the cylinder 3a is connected to the oil tank via the switch grade solenoid valve 10, the shutoff valve 2 retains its open state and the position of the booster 6 is retained as well because the open-close grade solenoid valve 9 is kept closed.

When the gas pipeline 1, for example, sustains damage on the downstream side thereof and a large volume of the gas leaks and, the pressure on the downstream side of the flow volume control valve 16 is lowered or the downstream side pressure is raised by some cause, the pressure switch 17 senses this accident and issues a signal for emergency stop or release of the shutoff valve 2 or the control room issues a signal for actuating the shutoff valve 2. In this case, the switch grade solenoid valve 10 switches and, at the same time, the open-close grade solenoid valve 9 opens to establish communication between the valve opening pressure side 3c of the cylinder 3a and the oil tank 8 so as to induce discharge of the oil in the valve opening pressure side 3c of the cylinder 3a into the oil tank 8. As a result, the hydraulic pressure raised by the booster 6 is now exerted on the valve closing pressure side 3e of the cylinder 3a to move the piston 3d to the right as shown in FIG. 5 and close the shutoff valve 2.

When the hydraulic pump 7 is operated in the ensuant state, the oil in the oil tank 8 opens the check valve 14 and advances to the oil chamber 6a of the booster 6 and, when the resultant hydraulic pressure overcomes the gas pressure in the gas chamber 6b of the booster 6 and surpasses the pressure on the secondary side of the pipeline, the gas so forwarded is advanced to the secondary side of the pipeline 1 and the booster 6 is reset by the action of the check valve 25 disposed in the gas Pipe 24.

To explain the preceding example more specifically, it is assumed that when the primary side pressure is 70 kgf/cm2 and the secondary side Pressure is 40 kgf/cm2, the pressure in the gas chamber 6b of the booster 6 required for generating the necessary torque of the valve at the difference of pressure is set at 30 kgf/cm2, for example. Consequently, the secondary side is checked by the check valve 25 while the booster 6 is in operation and reverse flow toward the reducing valve side is prevented by the check valve 23 while the booster is reset by the hydraulic pump 7. When the Pressure surpasses the secondary side pressure, it is passed through the check valve 25 and released toward the secondary side.

As a result, the gas which is required during the operation of the booster is neither consumed nor released into the open air.

Incidentally, the feeding of the waste gas from the booster 6 may be made to another line 26 passing a gas of the same kind as indicated by the chain line in FIG. 5 instead of to the secondary side of the gas pipeline mentioned above.

Figure 6:
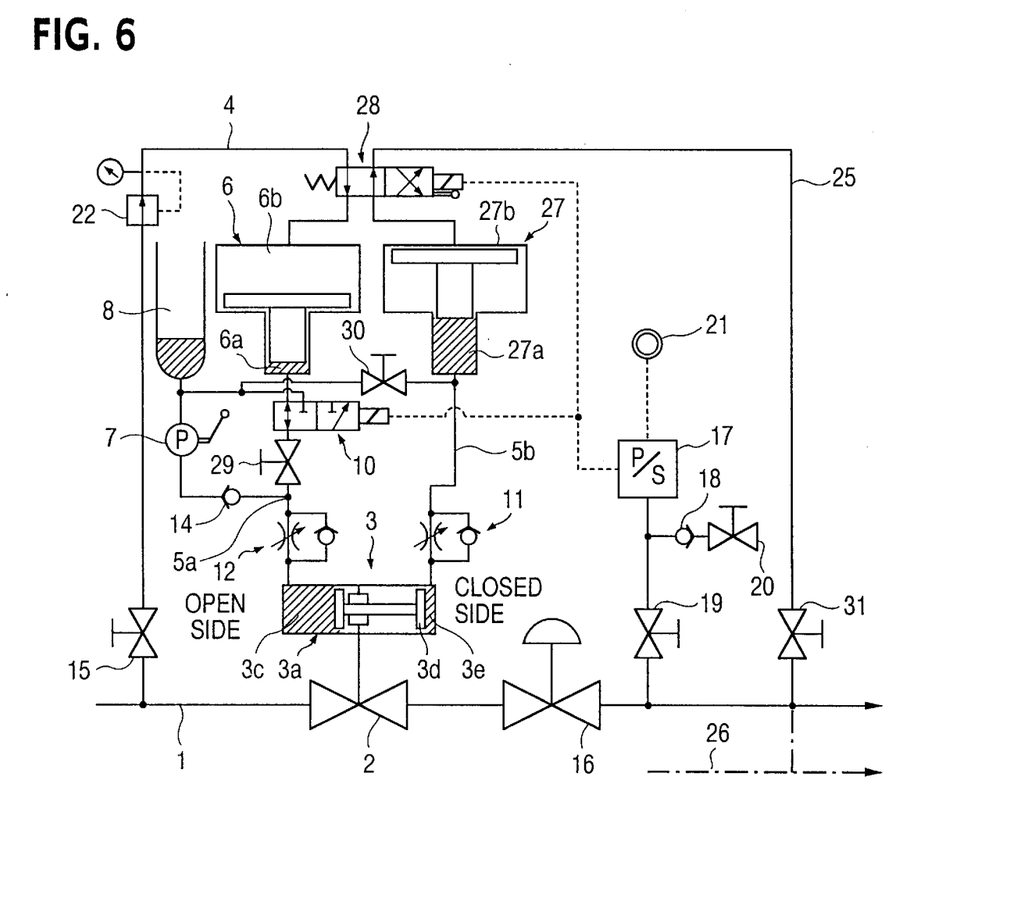
FIG. 6 is a piping system diagram illustrating a third embodiment of the valve driving apparatus according to the present invention.

FIG. 6 is a piping system diagram illustrating a third embodiment of the valve driving apparatus according to this invention. In this diagram, like parts in the first embodiment and the second embodiment found in FIG. 1 and FIG. 5 are denoted by like reference numerals. While these parts will be omitted from the following description, they have the same operations and effects as those of the first embodiment.

Oil Pipes 5a and 5b disposed on the opposite sides of the cylinder 3a of the actuator 3 are connected to the oil chambers 6a and 27a of the respective gas/oil type boosters 6 and 27 and a switch valve 28, like a four-way solenoid valve is disposed between the gas chambers 6b and 27b of these boosters 6 and 27 and the gas pipes 4 and 25 branched from the primary side and the secondary side of the gas pipeline 1, respectively so that one of the gas chambers 6b and 27b may be connected to the gas pipe 25 branched from the secondary side while the remainder of the two gas chambers 6b and 27b is connected to the gas pipe 4 branched from the primary side. In FIG. reference numerals 6, 29, 30, and 31 each represent a stop valve.

Now, the operation of the third embodiment illustrated in FIG. 6 will be explained below.

The switch valve 28 which is a four-way solenoid valve is now in such a state that the gas pipe 4, branched from the primary side of the gas pipeline 1, is connected to the gas chamber 6b of the booster 6 which in turn is connected to the valve opening pressure side 3c of the cylinder 3a. The gas chamber 27b of the booster 27 is connected to the gas pipe 25 branched from the secondary side. The shutoff valve 2 which is provided in the pipeline 1 is in an open state. Then, by the action of the control valve 16, which is disposed directly behind the shutoff valve 2, the pressure on the secondary side of the Pipeline 1 (3–40 kgf/cm2, for example) is significantly lower than the pressure on the primary side (20–70 kgf/cm2, for example) even when the shutoff valve 2 is in an open state.

When the switch valve 10 in the ensuant state is switched to connect the gas pipe 4 to the gas chamber 27b of the booster 27 which is connected to the valve closing pressure side 3e of the cylinder 3a and connect the gas chamber 6b of the booster 6 connected to the valve opening pressure side 3c of the cylinder to the gas pipe 25, the hydraulic pressure raised by the gas pressure on the primary side forces the piston 3d in the cylinder 3a toward the valve closing pressure side 3e and the oil on the valve opening pressure side 3e of the cylinder 3a is discharged to the booster 6, the gas in the gas chamber 6b of the booster 6 flows into the pipeline 1 on the secondary side, and the shutoff valve 2 is closed.

In this case, the booster 6 connected to the valve opening pressure side 3c also exerts the hydraulic pressure, raised by the pressure on the secondary side, on the valve opening pressure side 3c. For the purpose of operating the cylinder 3a so as to open the shutoff valve 2 as mentioned above, therefore, the difference of the hydraulic pressures which are generated when the gas pressures on the primary side and the secondary side of the gas pipeline 1 act respectively on the boosters 6 and 27 must be large enough to enable the cylinder 3a to generate such an operating force as is required for opening the shutoff valve 2. This condition arises when the pressure on the secondary side of the pipeline 1 is significantly lower than the pressure on the primary side.

Further, since the actuator 3 in the present embodiment is so constructed as to provide separate boosters 6 and 27 for the pressure pipes 5a and 5b on the opposite sides of the cylinder 3a, the boosters 6 and 27 are allowed to be operate at their respectively optimum capacities.

Figure 7:
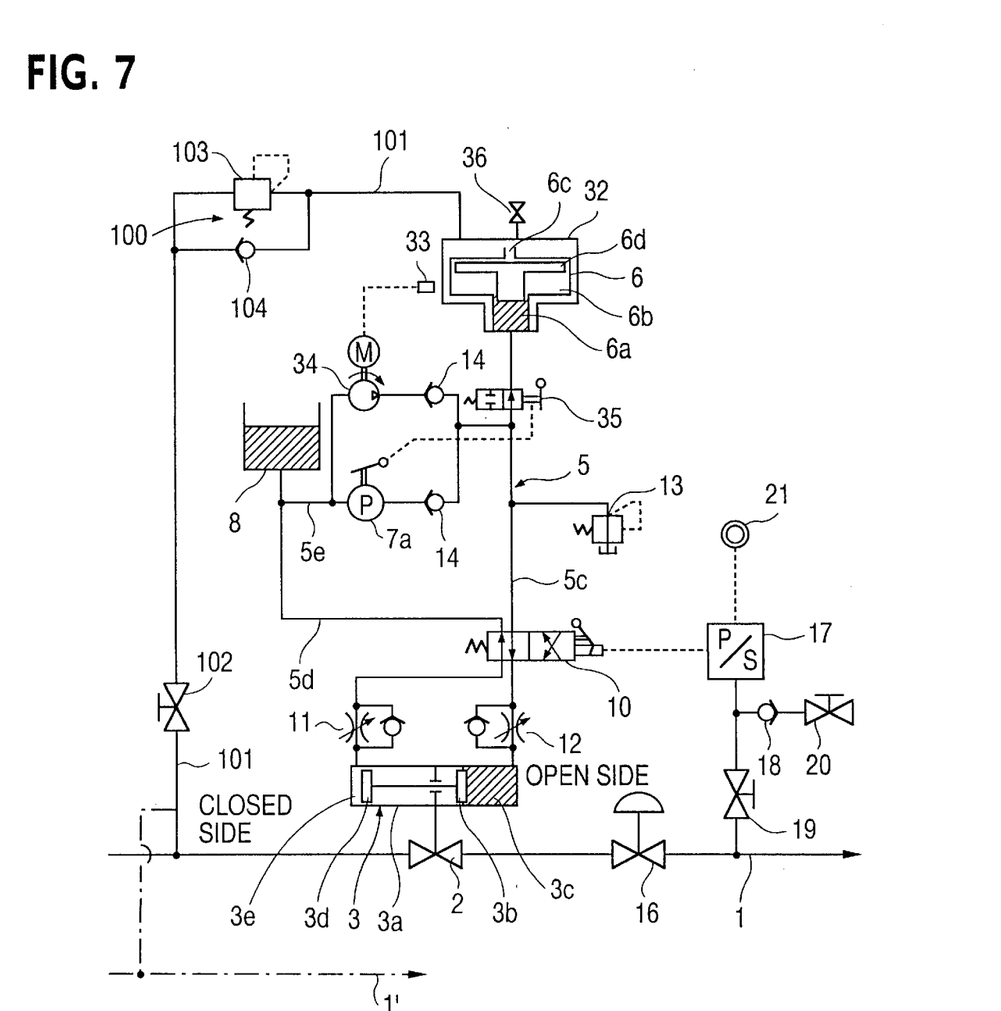
FIG. 7 is a piping system diagram illustrating a fourth embodiment of the valve driving apparatus according to the present invention.

FIG. 7 is a piping system diagram illustrating a fourth embodiment having the valve driving apparatus of this invention applied to a shutoff valve provided for a pipeline. In this diagram, like parts of the first through third embodiments in the relevant diagrams are denoted by like reference numerals. While the parts will be omitted from the following description, they have the same operations and effects as those of the first embodiment.

The actuator 3 mentioned above is operated with the hydraulic pressure produced by raising the gas pressure of a gas tank 32 by the booster 6. The actuator 3 and the booster 6 are connected by oil pipe 5. In this case, the gas tank 32 has an inert gas such as nitrogen gas or air sealed therein. Inside gas tank 32, the gas/oil type booster 6, which will be described specifically herein below, is disposed.

The valve opening pressure side 3c of the cylinder 3a is connected with the oil pipe 5c and the valve closing pressure side 3e of the cylinder 3a with the oil pipe 5d respectively to the oil tank 8. In the oil pipe 5e, connected to the oil tank 8, is a hydraulic pump 34 which is automatically operated by a sensor 33 serving the purpose of detecting the displacement of the booster 6.

By the pressure which is raised by the hydraulic pump 34 to a level higher than the pressure in the oil pipe 5c, the oil in the oil pipe 5 including the oil in the oil tank 8 is delivered to the oil chamber 6a of the booster 6, with the result that the booster 6 will be reset and the amount of oil in the oil chamber 6a of the booster 6 will be automatically replenished. The replenishment of the oil in the oil chamber 6a of the booster 6 may be otherwise accomplished by providing a manual switch valve 35 halfway along the length of the oil pipe 5c and also providing a manual pump 7a in the oil Pipe 5e.

The solenoid valve 10 as a switch valve for the oil pipe 5 is disposed halfway each along the lengths of the oil pipes 5c and 5d mentioned above. The shutoff valve 2 is opened and closed by the motions of the pistons 3b and 3d in the actuator which are produced due to the switch of the oil pipe 5 by solenoid valve 10. In FIG. 7, the reference numeral 36 represents a stop valve.

In the present embodiment, the gas tank 32 and the pipeline 1 are connected to each other with a feed pipe 101 and constant pressure feeding means 100 is disposed halfway along the length of feed pipe 101. The constant pressure feeding means 100 is composed of a back pressure valve 103 and a check valve 104 which are parallelly connected. Specifically, it is composed by connecting the secondary side of the back pressure valve 103 and connecting the inlet side of the check valve 104 and, at the same time, connecting the primary side of the back pressure valve 103 and the outlet side of the check valve 104. Then, the secondary side of the back pressure valve 103 is connected to the feed pipe 101 on the pipeline 1 side and the primary side of the back pressure valve 103 is connected to feed pipe 101 on the gas tank 32 side. The feed Pipe 101 on the pipeline 1 side is provided with a stop valve 102.

It is assumed in this case that the back pressure valve 103 and the check valve 104 are operated with respectively prescribed gas pressures, which may be set at arbitrary magnitudes. It should be noted that the constant pressure feeding means 100 mentioned in the foregoing description is an example which imposes no limitation in any sense. This means, therefore, may be constructed in any other way with the condition that it produce a motion equivalent to that of the construction described above.

The feed pipe 101 which is provided with the constant feeding means 100 may be connected to a pipeline 1' other than the pipeline 1 as indicated by a chain line in FIG. 7.

Figure 8:
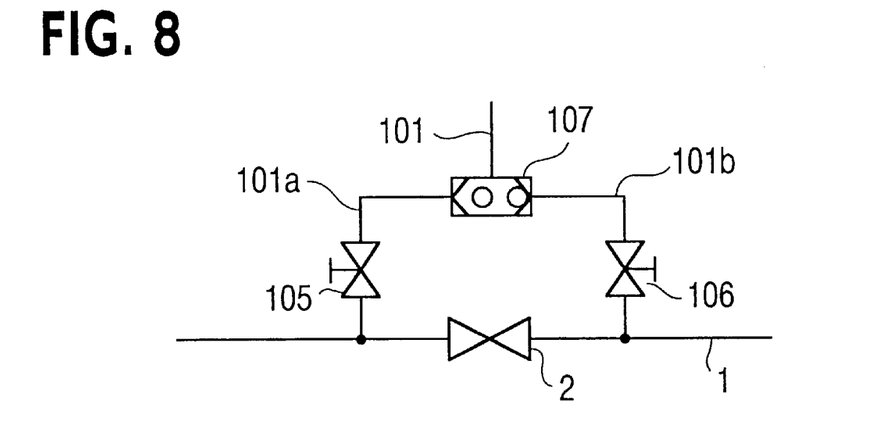
FIG. 8 is a partial piping system diagram illustrating one example of a method for feeding gas to a constant pressure feeding means in FIG. 7.

Incidentally, the efficiency with which the filling of the gas tank 32 with the gas is effected increases in accordance with the rising filling pressure. The feed pipe 101 which is connected to the gas tank 32, therefore, is preferred to be connected to the part of the pipeline 1 which has higher pressure. In the present embodiment, such an auxiliary circuit, as illustrated in FIG. 8, may be additionally provided.

For the sake of this addition, one end of a feed Pipe 101*a* is connected to the inlet side of the shutoff valve 2 provided in the pipeline 1 and one end of a feed pipe 101*b* is connected to the outlet side of the shutoff valve 2. Then, a shuttle valve 107 is provided for the remaining ends of the two feed pipes 101*a* and 101*b*. The feed pipe 101 is connected to the outlet side of the shuttle valve 107 and further connected to the gas tank 32 through the medium of the constant pressure feeding means 100. The reference numerals 105 and 106 each represent a shot valve. With this construction, the gas tank 32 can be efficiently filled with gas in case of need because the shuttle valve 107 is enabled to select automatically the side of the pipeline 1 having a higher pressure and connect the feed pipe 101 to that side.

Figure 10:
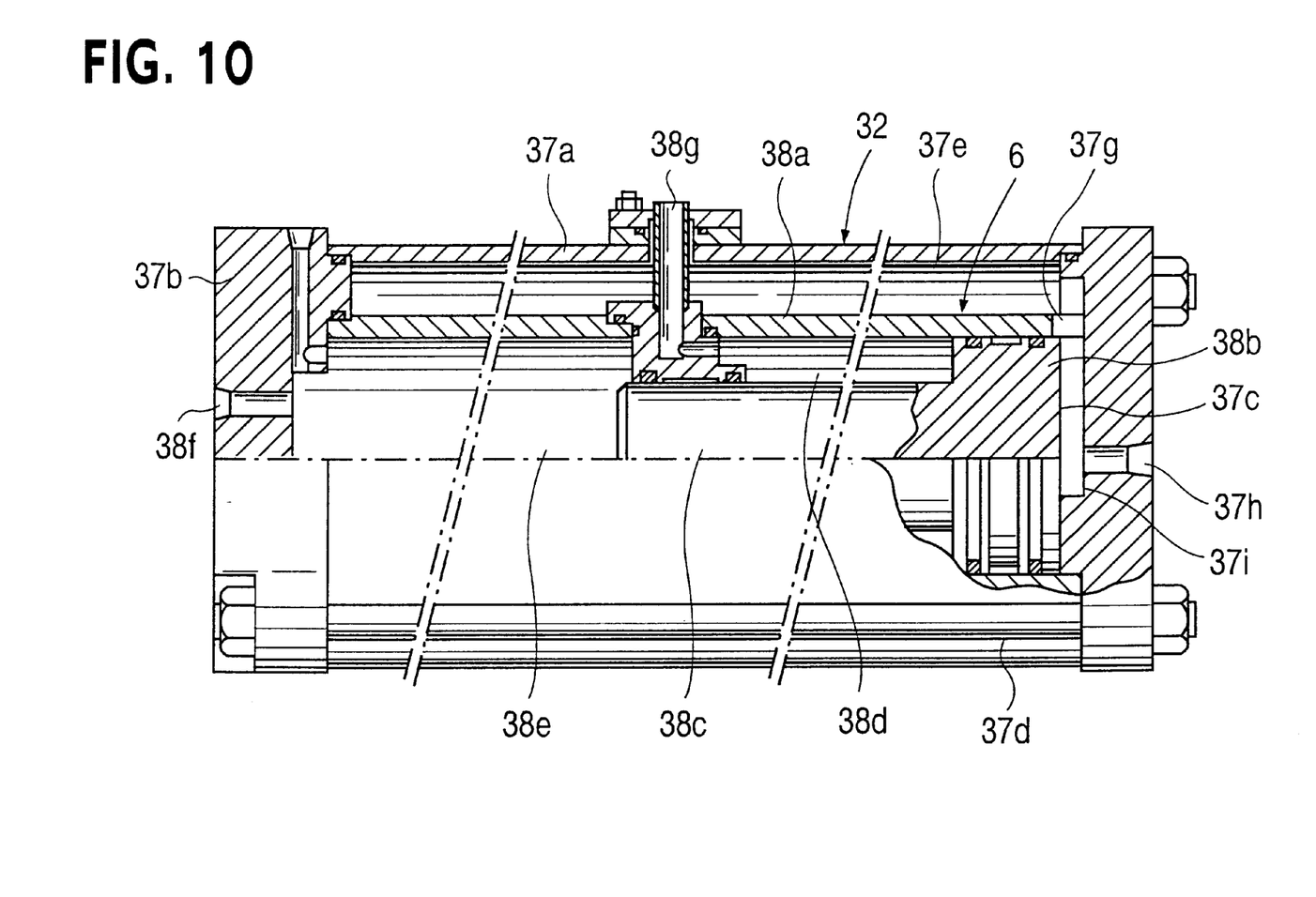
FIG. 10 is a cross section illustrating one example of the state in which a booster is disposed within a gas tank.

To cite one example of the construction which combines the gas tank 32 with the gas/oil type booster 6, FIG. 10 depicts an example of the gas/oil type booster 6 which is disposed inside the gas tank 32. A gas cylinder 37*a* has opposite ends thereof sealed with head covers 37*b* and 37*c* by welding or by the use of 0 rings and they are joined in a tightly sealed condition with a tie rod 37*d*. An oil cylinder 38*a* is concentrically disposed within the gas cylinder 37*a*. The empty space surrounding the oil cylinder 38*a* is utilized as a gas chamber 37*e* for the gas tank 32. A piston 38*b* and a piston rod 38*c* are disposed inside the booster 6. The space intervening between the oil cylinder 38*a* and the piston rod 38*c* is utilized as an air chamber 38*d*. The gas chamber 37*e* and a gas chamber 37*i* communicate with a through hole 37*g* which is provided with a gas port 37*h*. At the leading end of the oil chamber 38*e* disposed at the leading end of the piston rod 38*c*, an oil port 38*f* connected to the cylinder 3*a* of the actuator 3 is provided. In order to detect the position of the piston rod 38*c*, a proper mechanism which makes use of an open air port 38*g* (such as, for example, a sensor 33) is disposed.

Here, the case of using the gas tank 32 shown in FIG. 7 and FIG. 10 as the power source mentioned above will be studied. The initial pressure and capacity are expressed by the following formulas. The actuator 3, intended for emergency shutdown, constantly keeps the valve in the opened state and produces three motions, i.e. open close open close, even during power failure. In this case, the second motion of close open has large torque and demands the necessary torque mentioned above.

The amount of motion of the oil of the actuator 3 is as shown below.

$$\Pi/4 \times 9^2 \times 10 \times 2 = 1{,}272.3 \text{ cm}^3$$

The amount of motion of the rod of the booster 6 is as shown below.

$$1{,}272.3/\Pi/4 \times 11.2^2 \times l_1$$

$$l_1 = 12.91 \text{ cm}$$

The power source side capacity, W, necessary for one motion of the rod of the booster 6 is as shown below.

$$W = \pi/4 \times 18^2 \times 12.91$$

$$= 3{,}285 \text{ cm}^3$$

$$= 3.3 \text{ l}$$

Assume that the capacity of the gas tank 32 is 20 liters and the initial pressure is 80 kgf/cm2 G, then the pressure $P^1$ of the gas tank 32 after one motion (before two motions) will be as shown below.

$$P^1 = (80 + 1{,}033) \times 20/20 \times 3.3$$

$$= 69.556 \text{ kgf cm}^2$$

$$= 68.523 \text{ kgf cm}^2 \text{G (gauge pressure)}$$

The pressure, $P^2$, of the gas tank 32 after two motions (before three motions) will be as shown below.

$$P^2 = (68.523 \times 1.033) \times (20 + 3.3)/20 + 3.3 + 3.3$$

$$= 60.927 \text{ kgf cm}^2$$

$$= 59.894 \text{ kgf cm}^2 \text{G (gauge pressure)}$$

The pressure, $P^3$, of the gas tank 32 after three motions will be as shown below.

$$P^3 = (59.894 + 1.033) \times (20 + 3.3 + 3.3)/20 + 3.3 + 3.3 + 3.3$$

$$= 54.203 \text{ kgf cm}^2$$

$$= 53.170 \text{ kgf cm}^2 \text{G (gauge pressure)}$$

The output torque, $T^2$, during the two motions will be as shown below.

$$T_2 = \pi/4 \times 9^2 \times 10 \times 68.523 \times 2.58 \times 2$$

$$= 224{,}937 \text{ kgcm}$$

$$= 2{,}249 \text{ kgm}$$

The output torque, $T_3$, during the three motions will be as shown below.

$$T_3 = \pi/4 \times 9^2 \times 10 \times 59.894 \times 2.58 \times 2$$

$$= 196{,}611 \text{ kgcm}$$

$$= 1{,}966 \text{ kgm}$$

The output torque, $T_3$, after the three motions will be as shown below.

$$T_3 = \pi/4 \times 9^2 \times 10 \times 53.170 \times 2.58 \times 2$$
$$= 174{,}538 \text{ kgcm}$$
$$= 1.745 \text{ kgm}$$

Figure 11:
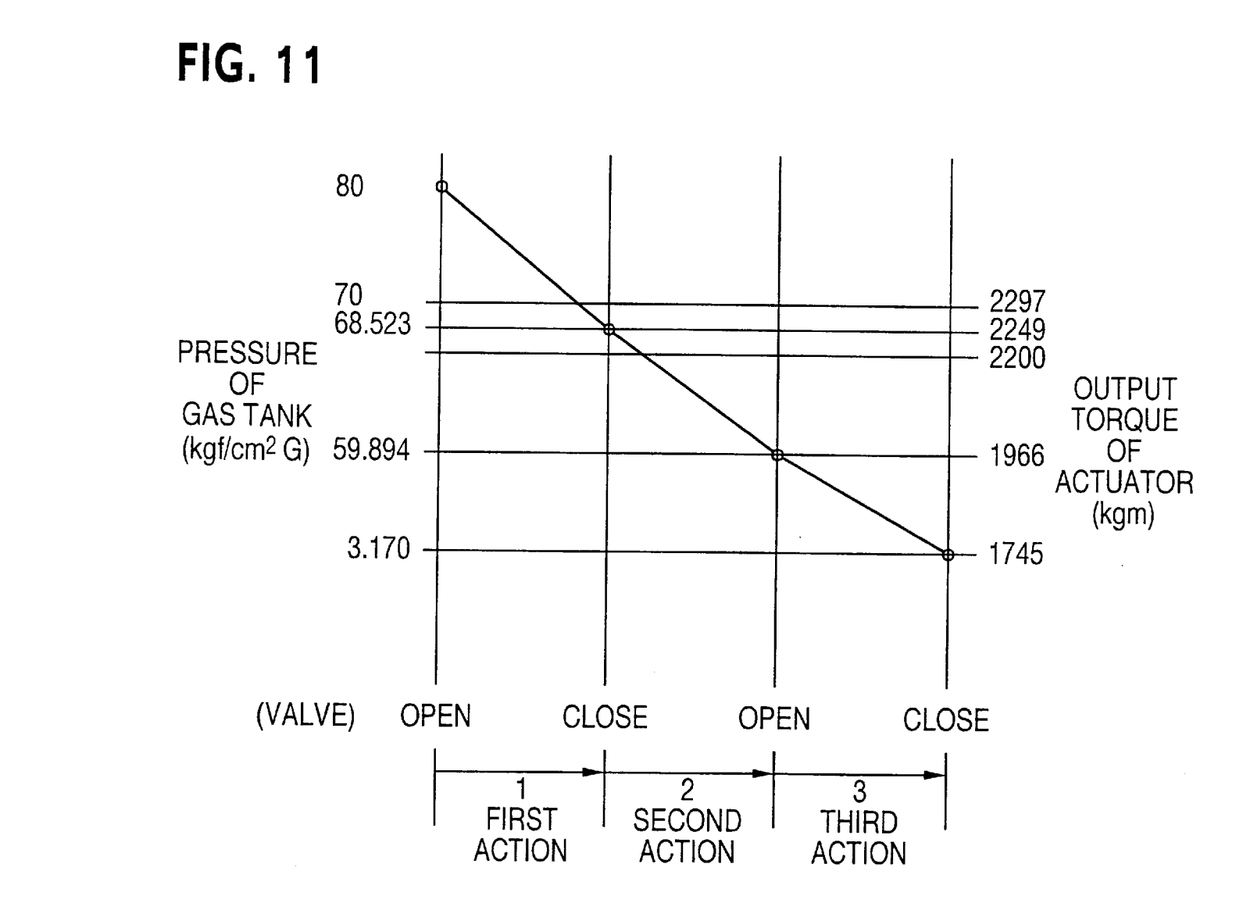
FIG. 11 is a diagram comparing the pressure of the gas tank and output torque of the actuator.

These results are diagrammatically represented in FIG. 11.

In the shutoff valve 2 of the present embodiment, about 450 kgm is sufficient for the torque during the open close motion. From the data given above, it is certain that the capacity of 20 liters and the initial pressure of 80 kgf/cm2 G found by the calculations shown above are sufficient for the gas tank 32. The experiment given above represents one choice from among the embodiments cited above. Naturally, it imposes no limitation in any sense.

Now, the operation of the fourth embodiment described above will be explained.

The oil Pipes 5c, 5d, and 5e which are installed between the booster 6 and the opposite sides of the cylinder 3a of the actuator 3 are provided, as illustrated in FIG. 7, with the solenoid valve 10 for switching the oil page 5, the hydraulic pump 34, a manual pump 7a, the speed controllers 11 and 12, the check valves 14 and 14a, and the relief valve 13. Though the solenoid valve 10 is furnished with a manually operating lever, it is adapted to be operated by an emergency signal issued by the pressure switch 17 or by an operational signal issued from the control room.

In this construction, the hydraulic pressure, which is produced when the gas pressure in the gas tank 32 is raised by the booster 6, is utilized for driving the actuator 3 to open and close the shutoff valve 2 provided in the pipeline 1.

The gas pressure originating in the gas tank 32 having such an inert gas as nitrogen gas sealed therein and delivered via a through hole 6c is exerted in a prescribed width of variation in the gas chamber 6b of the gas/oil type booster 6. In the oil chamber 6a of the booster 6, the oil port and the valve opening pressure side 3c of the cylinder 3a of the actuator 3 are connected with the oil pipe 5c and the hydraulic pressure exalted by the booster 6, using the gas pressure as the power source, is exerted on the piston 3b on the valve opening pressure side 3c. The other side, namely the valve closing pressure side 3b, of the cylinder 3a passes through the solenoid valve 10 and is connected to the oil tank 8 through the medium of the oil pipe 5d.

Figure 9:
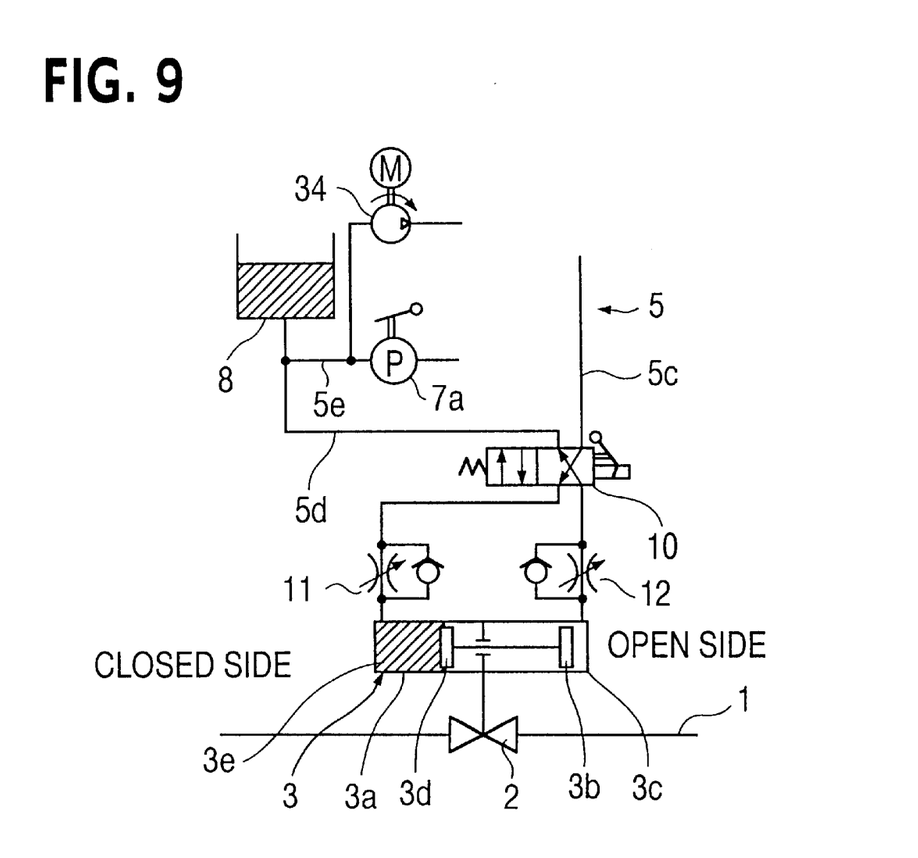
FIG. 9 is a partial piping system diagram illustrating the state of switching a hydraulic line while the shutoff valve is in a closed state.

When the gas pipeline 1, for example, sustains damage on the downstream side thereof causing leakage and, as a result, the pressure of the pipeline 1 is lowered, the pressure switch 17 senses this accident and issues a signal for emergency stop or release of the shutoff valve 2 or the control room issues a signal for actuating the shutoff valve 2. In this case, the solenoid valve 10 switches the oil pipe 5 as shown in FIG. 9.

Then, the valve opening pressure side 3c of the cylinder 3a and the oil tank 8 communicate, and meanwhile the valve closing pressure side 3e of the cylinder 3a and the oil chamber 6a of the booster 6 communicate. As a result, the hydraulic pressure raised by the booster 6 is exerted on the valve closing pressure side 3e of the cylinder 3a to move the piston 3d to the right and close the shutoff valve 2 and, at the same time, the piston 3b interlocked with the piston 3d causes the oil in the valve opening pressure side of the cylinder 3a to be discharged into the oil tank 8.

When the sensor 33 or a proper position detecting mechanism senses displacement of the piston 6d of the booster 6, the hydraulic pump 34 is actuated and the oil in the oil tank 8 opens the check valve 14 and advances into the oil chamber 6a of the booster 6 and the resultant hydraulic pressure resets the piston 6d of the booster 6 while forcing the gas in the gas chamber 6b of the booster 6 back to the gas tank 32 which is formed around the periphery of the booster 6.

The gas Pressure in the gas tank 32 is forwarded via a through hole 6c is exerted in a prescribed width of variation in the gas chamber 6b of the gas/oil type booster 6. In the oil chamber 6a of the booster 6, the oil port and the valve opening pressure side 3c of the cylinder 3a of the actuator 3 are connected with the oil pipe 5c and the hydraulic pressure raised by the booster 6 using the gas pressure as the power source is exerted on the piston 3b on the valve opening pressure side 3c. The other side, namely the valve closing pressure side 3b, of the cylinder 3a is connected to the oil tank 8 through the oil pipe 5d which passes through the solenoid valve 10.

When the gas pipeline 1, for example, sustains damage on the downstream side thereof and entrains leakage and, as a result, the pressure of the pipeline 1 is lowered, the pressure switch 17 senses this accident and issues a signal for an emergency stop or release of the shutoff valve 2 or the control room issues a signal for actuating the shutoff valve 2. In this case, the solenoid valve 10 switches the oil pipe 5 as shown in FIG. 9.

Then, the valve opening pressure side 3c of the cylinder 3a and the oil tank 8 communicate and meanwhile the valve closing Pressure side 3e of the cylinder 3a and the oil chamber 6a of the booster 6 communicate. As a result, the hydraulic pressure raised by the booster 6 is exerted on the valve closing pressure side 3e of the cylinder 3a so as to move the piston 3d to the right and close the shutoff valve 2. And, at the same time, the piston 3b interlocked with the Piston 3d causes the oil in the valve opening pressure side of the cylinder 3a to be discharged into the oil tank 8.

When the sensor 33 or a proper position detecting mechanism senses a displacement of the piston 6d of the booster 6, the hydraulic Pump 34 is actuated and the oil in the oil tank 8 opens the check valve 14 and advances to the oil chamber 6a of the booster 6 and the resultant hydraulic pressure resets the piston 6d of the booster 6 while forcing the gas in the gas chamber 6b of the booster 6 back to the gas tank 32 which is formed around the periphery of the booster 6.

The gas pressure in the gas tank 32 is allowed a prescribed width of variation for the sake of the actuation of the booster 6. When the gas pressure in the gas tank 32 is weakened by repeated operation (opening and closing of the shutoff valve 2) of the actuator 3 and ultimately suffered to decrease below the normal width of variation, the gas tank 32 is replenished with the fluid of the pipeline 1 which is introduced via the constant pressure feeding means 100.

Specifically, since the constant pressure feeding means 100 is composed of the back pressure valve 103 and the check valve 104, when the gas pressure in the gas tank 32 falls below the prescribed level, the fluid flowing through the pipeline 1 flows through the check valve 104 into the gas tank 32 until the gas pressure rises above the prescribed level. When the gas pressure in the gas tank 32 is raised above the prescribed level as a result of the operation of the hydraulic pump 34, the back pressure valve 103 is actuated to release the excess gas to the secondary side (pipeline 1) of the back pressure valve 103 so that the gas pressure in the gas tank 32 may be retained at the set level. When the feed pipe 101 is connected to another pipeline 1' as indicated by a chain line in FIG. 7, the excess gas mentioned above is released into the other pipeline 1'.

As a result, the gas pressure in the gas tank 32 can be kept constantly at the prescribed level. The gas tank 32, therefore, absolutely does not need replenishment of gas or the replacement of a cylinder. Moreover, it enjoys perfect safety and great economy in the sense that even when the gas pressure therein happens to rise above the prescribed level, the excess gas is returned to the pipeline 1 and is not released into the open air. Further, the addition of the circuit illustrated in FIG. 8 enables the filling of the gas tank 32 with the gas to be carried out with high efficiency because it allows automatic selection of the side of the pipeline 1 of higher pressure for connection to the feed Pipe 101.

We claim:

1. A valve driving assembly for actuating a shutoff valve or a dump valve incorporated in a gas pipeline, said valve driving assembly comprising:

a gas/oil type booster having a gas chamber and an oil chamber;

a gas pipe branched from a primary side of the gas pipeline and communicating with said gas chamber of said gas/oil type booster;

an actuator having an actuator cylinder;

a hydraulic pump disposed between said gas/oil type booster and said actuator cylinder, said hydraulic pump being connected to said oil chamber of said gas/oil type booster;

an oil pipe connecting said hydraulic pump and said oil chamber of said gas/oil type booster with said actuator cylinder through a switching valve, wherein said oil/gas type booster is powered by the primary side pressure of the gas pipeline such that increased hydraulic pressure can be delivered to said actuator cylinder in order to open and close the shutoff valve or the dump valve, and wherein said oil/gas type booster can be reset with pressure output from said hydraulic pump thereby causing the gas in said gas chamber of said oil/gas type booster to return to the gas pipeline via said gas pipe.

2. A valve driving assembly as claimed in claim 1, further comprising an oil tank fluidly connected to said hydraulic pump.

3. A valve driving assembly as claimed in claim 1, wherein said actuator includes a piston device movably disposed in said actuator cylinder, and one stroke of said oil/gas booster is can discharge an amount of oil which is sufficient to induce at least two strokes of said actuator.

4. A valve driving assembly as claimed in claim 3, wherein said piston device comprises a pair of spaced pistons coupled together by a connecting rod.

5. A valve driving assembly for opening and closing a shutoff valve or a dump valve provided in a gas pipeline, said valve driving assembly comprising:

an actuator having an actuator cylinder;

a gas/oil type booster having a gas chamber and an oil chamber;

a first gas pipe extending from a primary side of the gas pipeline to said gas chamber of said gas/oil type booster;

a reducing valve disposed in said first gas pipe;

a first check valve disposed in said first gas pipe between said reducing valve and said gas/oil type booster, wherein said oil/gas booster is powered by gas pressure conveyed by said first gas pipe to said gas chamber;

a second gas pipe extending from said gas chamber of said gas/oil type booster;

a second check valve positioned in said second gas pipe to permit flow from said oil/gas type booster through said second gas pipe;

an oil circuit connecting said oil chamber of said oil/gas type booster with said actuator cylinder, wherein said actuator is operable to close and open the shutoff valve or the dump valve by the hydraulic pressure output from said oil/gas type booster; and a hydraulic pump disposed in said oil circuit between said actuator and said oil chamber of said oil/gas type booster, wherein said hydraulic pump is operable to reset said oil/gas type booster thereby causing the gas in said gas chamber to be fed through said second gas pipe.

6. A valve driving assembly as claimed in claim 5, wherein said first gas pipe, said oil/gas type booster, and said second gas pipe are arranged so the pressure on the primary side of the pipeline is greater than the pressure on a secondary side of the pipeline which is greater than the pressure in said gas chamber of said oil/gas type booster.

7. A valve driving assembly as claimed in claim 5, wherein said second gas pipe is connected to a secondary side of the gas pipeline so that gas from said gas chamber of said oil/gas type booster will be fed to the secondary side of the gas pipeline via said second gas pipe.

8. A valve driving assembly as claimed in claim 5, wherein said second gas pipe is connected to another pipeline passing a gas of the same kind.

9. A valve driving assembly for actuating a shutoff valve or a dump valve incorporated in a gas pipeline, said valve driving assembly comprising:

a first gas/oil type booster having a gas chamber and an oil chamber;

a second gas/oil type booster having a gas chamber and an oil chamber;

a switch valve;

a first gas pipe branched from a primary side of the gas pipeline and communicating with said gas chambers of said first and second gas/oil type boosters via said switch valve;

a second gas pipe communicating with said gas chambers of said first and second gas/oil type boosters via said switch valve and connected to a secondary side of the gas pipeline;

an actuator having an actuator cylinder;

a hydraulic pump disposed between said first and second gas/oil type boosters and said actuator cylinder, said hydraulic pump selectively communicating with said oil chambers of said first and second gas/oil type boosters; and an oil pipe connecting said hydraulic pump and said oil chambers of said gas/oil type boosters with said actuator cylinder through a switching valve, wherein said first and second oil/gas type boosters are powered by the primary side pressure of the gas pipeline such that increased hydraulic pressure can be delivered to said actuator cylinder in order to open and close the shutoff valve or the dump valve.

10. A valve driving assembly as claimed in claim 9, wherein said oil pipe can be selectively communicated with either side of the actuator cylinder, and said first and second oil/gas type boosters can be reset with pressure output from said hydraulic pump thereby causing the gas in said gas chamber of said first and second oil/gas type boosters to be fed to the secondary side of the gas pipeline via said second gas pipe.

11. A valve driving assembly as claimed in claim 10, further comprising an oil tank in fluid communication with said hydraulic pump, wherein said first and second oil/gas type boosters can be selectively switched to said oil tank, and the oil in said oil tank is subsequently pumped by said hydraulic pump to said actuator cylinder or said boosters.

12. A valve driving assembly for actuating a shutoff valve or a dump valve provided in a pipeline for conveying a fluid, said valve driving assembly comprising:

a gas tank connected to the pipeline;

a booster disposed inside of said gas tank, said booster having a gas chamber and an oil chamber, wherein said gas chamber is in communication with said gas tank and pressure from said gas tank is the power source for said booster;

a valve actuator;

a switch valve disposed between said valve actuator and said booster;

an oil pipe selectively connecting said booster with said actuator through said switch valve, wherein a pressure output from said booster operates said valve actuator so as to open or close the shutoff valve or the dump valve;

a feed pipe connecting said gas tank and the pipeline; and a constant pressure feed means disposed along said feed pipe.

13. A valve driving apparatus according to claim 12, wherein said constant pressure means comprises a back pressure valve and a check valve connected in parallel, wherein a secondary side of said back pressure valve and an inlet side of a check valve are connected and, a primary side of said back pressure valve and an outlet side of said check valve are connected, and the secondary side of said back pressure valve is connected to said feed pipe on the pipeline side and the primary side of said back pressure valve is connected to the feed pipe on the gas tank side.

14. A valve driving apparatus as claimed in claim 12, wherein said gas tank is filled, at a prescribed pressure level, with a gas selected from among air, nitrogen, carbon dioxide, or an inert gas which may be commingled with fluid from the pipeline, and, when the gas pressure in said gas tank falls below said prescribed level, the fluid in said pipeline fills said gas tank until the pressure in said gas tank returns to said prescribed level so that the pressure is said gas tank is maintained at a constant level.

* * * * *